United States Patent [19]
Jackson

[11] Patent Number: 6,145,475
[45] Date of Patent: Nov. 14, 2000

[54] PET ACCESSORY FOR A TOILET

[76] Inventor: Kathryn Jackson, P.O. Box 152, Butler, Ala. 36904

[21] Appl. No.: 09/252,104

[22] Filed: Feb. 18, 1999

[51] Int. Cl.[7] .................................................. A01K 1/035
[52] U.S. Cl. ............................................................ 119/162
[58] Field of Search ....................... 119/162; 248/225.21, 248/221.11, 222.11; 4/661

[56] References Cited

U.S. PATENT DOCUMENTS

| D. 256,735 | 9/1980 | Denk ........................................ D30/99 |
| D. 271,435 | 11/1983 | Kullenback .............................. D30/99 |
| 2,801,424 | 8/1957 | Mercer . | |
| 3,466,145 | 9/1969 | Van Duyne . | |
| 3,688,742 | 9/1972 | Mcgee ..................................... 119/162 |
| 4,181,096 | 1/1980 | Grubman ................................. 119/162 |

*Primary Examiner*—Thomas Price

[57] ABSTRACT

A pet accessory for a toilet for mounting in the toilet bowl of a toilet to permit a cat to use the toilet as a litter box. The pet accessory includes a platform with a spaced apart pair of mounting arms upwardly extending from each of the side edges of the platform. Each mounting arm has a lower portion and a upper portion outwardly extending in a direction away from the platform. The upper portions of the mounting arms are designed for resting on a rim of a toilet bowl. The lower portions of the mounting arms are designed for downwardly extending into the toilet bowl such that the platform is positioned in the toilet bowl.

9 Claims, 3 Drawing Sheets

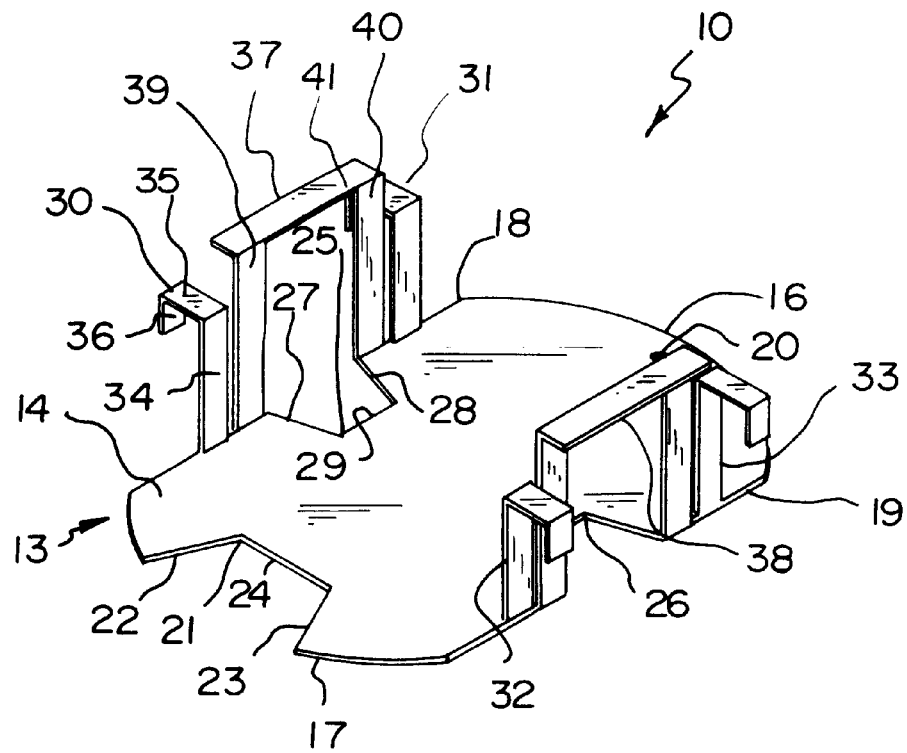
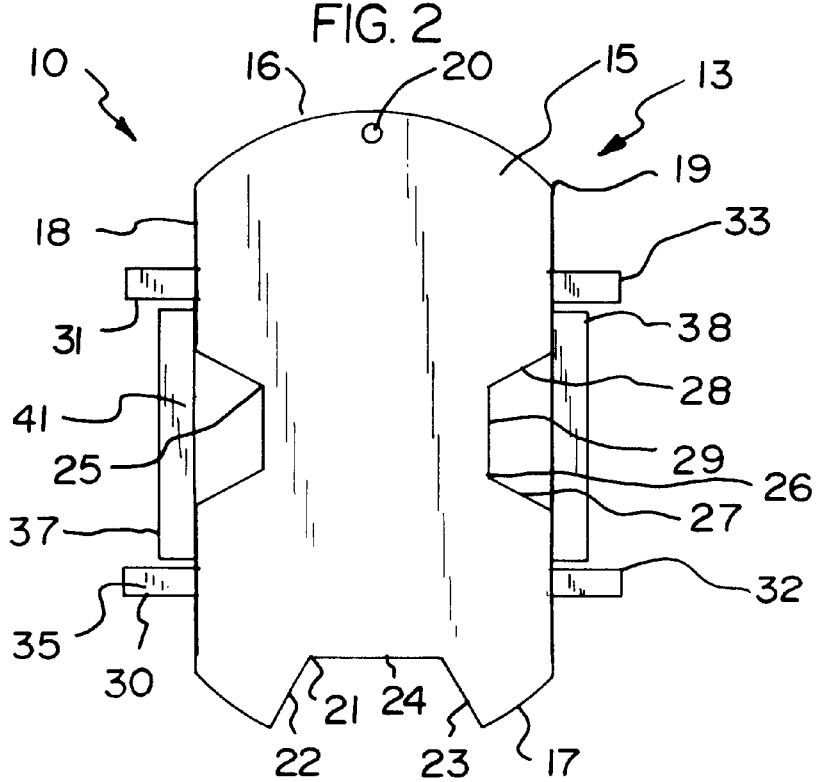

PET ACCESSORY FOR A TOILET

BACKGROUND OF THE INVENTION

1. Field of the Invention

The present invention relates to pet accessories for a toilet and more particularly pertains to a new pet accessory for a toilet for mounting in the toilet bowl of a toilet to permit a cat to use the toilet as a litter box.

2. Description of the Prior Art

The use of pet accessories for a toilet is known in the prior art. More specifically, pet accessories for a toilet heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,103,772; U.S. Pat. No. 5,216,979; U.S. Pat. No. 4,437,430; U.S. Pat. No. 4,262,634; U.S. Pat. No. 4,231,321; and U.S. Pat. No. Des. 256,735.

While these devices fulfill their respective, particular objectives and requirements, the aforementioned patents do not disclose a new pet accessory for a toilet. The inventive device includes a platform with a spaced apart pair of mounting arms upwardly extending from each of the side edges of the platform. Each mounting arm has a lower portion and a upper portion outwardly extending in a direction away from the platform. The upper portions of the mounting arms are designed for resting on a rim of a toilet bowl. The lower portions of the mounting arms are designed for downwardly extending into the toilet bowl such that the platform is positioned in the toilet bowl.

In these respects, the pet accessory for a toilet according to the present invention substantially departs from the conventional concepts and designs of the prior art, and in so doing provides an apparatus primarily developed for the purpose of mounting in the toilet bowl of a toilet to permit a cat to use the toilet as a litter box.

SUMMARY OF THE INVENTION

In view of the foregoing disadvantages inherent in the known types of pet accessories for a toilet now present in the prior art, the present invention provides a new pet accessory for a toilet construction wherein the same can be utilized for mounting in the toilet bowl of a toilet to permit a cat to use the toilet as a litter box.

The general purpose of the present invention, which will be described subsequently in greater detail, is to provide a new pet accessory for a toilet apparatus and method which has many of the advantages of the pet accessories for a toilet mentioned heretofore and many novel features that result in a new pet accessory for a toilet which is not anticipated, rendered obvious, suggested, or even implied by any of the prior art pet accessories for a toilet, either alone or in any combination thereof.

To attain this, the present invention generally comprises a platform with a spaced apart pair of mounting arms upwardly extending from each of the side edges of the platform. Each mounting arm has a lower portion and a upper portion outwardly extending in a direction away from the platform. The upper portions of the mounting arms are designed for resting on a rim of a toilet bowl. The lower portions of the mounting arms are designed for downwardly extending into the toilet bowl such that the platform is positioned in the toilet bowl.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new pet accessory for a toilet apparatus and method which has many of the advantages of the pet accessories for a toilet mentioned heretofore and many novel features that result in a new pet accessory for a toilet which is not anticipated, rendered obvious, suggested, or even implied by any of the prior art pet accessories for a toilet, either alone or in any combination thereof.

It is another object of the present invention to provide a new pet accessory for a toilet which may be easily and efficiently manufactured and marketed.

It is a further object of the present invention to provide a new pet accessory for a toilet which is of a durable and reliable construction.

An even further object of the present invention is to provide a new pet accessory for a toilet which is susceptible of a low cost of manufacture with regard to both materials and labor, and which accordingly is then susceptible of low prices of sale to the consuming public, thereby making such pet accessory for a toilet economically available to the buying public.

Still yet another object of the present invention is to provide a new pet accessory for a toilet which provides in the apparatuses and methods of the prior art some of the advantages thereof, while simultaneously overcoming some of the disadvantages normally associated therewith.

Still another object of the present invention is to provide a new pet accessory for a toilet for mounting in the toilet bowl of a toilet to permit a cat to use the toilet as a litter box.

Yet another object of the present invention is to provide a new pet accessory for a toilet which includes a platform with a spaced apart pair of mounting arms upwardly extending from each of the side edges of the platform. Each mounting arm has a lower portion and a upper portion outwardly extending in a direction away from the platform. The upper portions of the mounting arms are designed for resting on a rim of a toilet bowl. The lower portions of the mounting arms are designed for downwardly extending into the toilet bowl such that the platform is positioned in the toilet bowl.

Still yet another object of the present invention is to provide a new pet accessory for a toilet that is placed low enough into a toilet bowl so that when the toilet is flushed, the water flushing the toilet bowl submerges a portion of the accessory to flush the pet's waste down the toilet drain.

Even still another object of the present invention is to provide a new pet accessory for a toilet that eliminates the need to have a traditional litter box for a cat.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic rear perspective view of a new pet accessory for a toilet according to the present invention.

FIG. 2 is a schematic bottom side view of the invention.

DESCRIPTION OF THE PREFERRED EMBODIMENT

Figure 3:
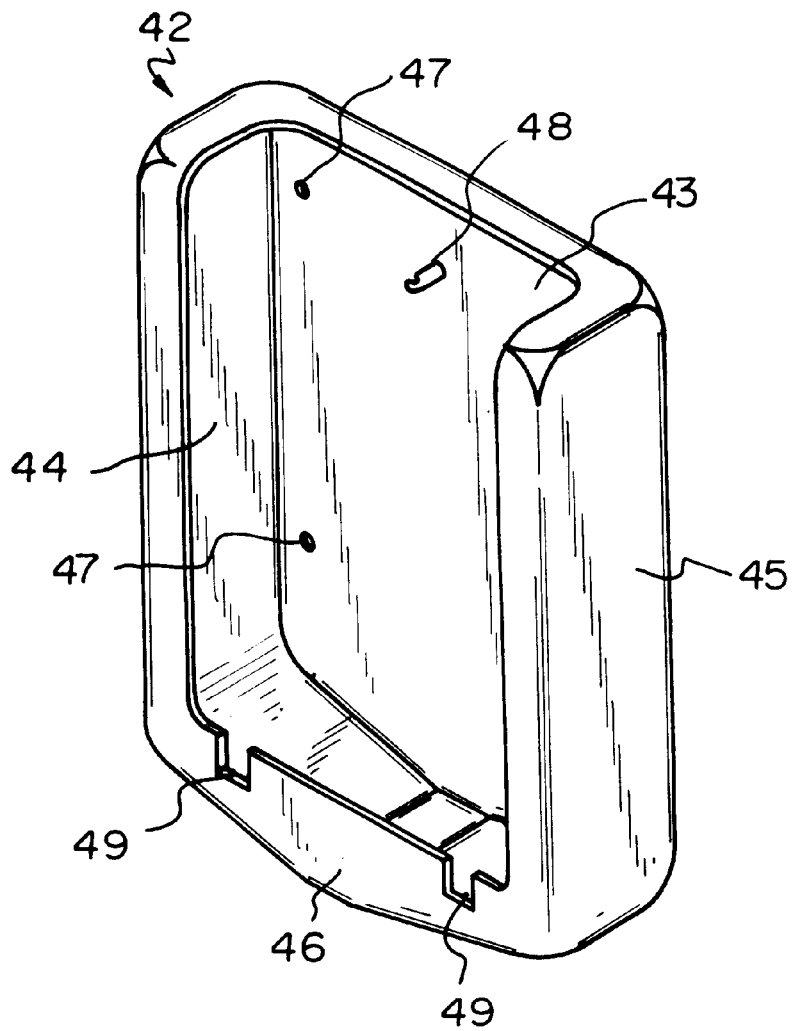
FIG. 3 is a schematic perspective view of a drip tray of the present invention.

With reference now to the drawings, and in particular to FIGS. 1 through 5 thereof, a new pet accessory for a toilet embodying the principles and concepts of the present invention and generally designated by the reference numeral 10 will be described.

The pet accessory 10 is designed for mounting on a toilet bowl 11 having an upper rim 12, an non-flushed water level when the toilet bowl is in an non-flushed state, and a flushed water level above the non-flushed water level when the toilet bowl is flushed with water. As best illustrated in FIGS. 1 through 5, the pet accessory for a toilet 10 generally comprises a platform with a spaced apart pair of mounting arms upwardly extending from each of the side edges of the platform. Each mounting arm has a lower portion and a upper portion outwardly extending in a direction away from the platform. The upper portions of the mounting arms are designed for resting on a rim of a toilet bowl. The lower portions of the mounting arms are designed for downwardly extending into the toilet bowl such that the platform is positioned in the toilet bowl.

In closer detail, the pet accessory comprises a generally flat platform 13 with substantially planar top and bottom surfaces 14,15, front and back edges 16,17 and a pair of generally parallel side edges 18,19 extending between the front and back edges of the platform. The front and back edges of the platform each are generally arcuate and each have an outwardly facing convexity. The platform preferably has a generally circular aperture 20 therethrough extending between the top and bottom surfaces of the platform. The aperture is preferably positioned towards the front edge of the platform and generally centrally positioned between the side edges of the platform. In use, the aperture is designed for extending a hook on a wall structure therethrough to suspend the platform from the hook when not in use.

The back edge of the platform has a generally trapezoidal rear cutout 21 generally centrally positioned on the back edge of the platform between the side edges of the platform. The rear cutout of the back edge has a spaced apart pair of short sides 22,23 and a long side 24 connecting the short sides of the rear cutout together. The long side of the read cutout is preferably extended generally perpendicular to the side edges of the platform. In an ideal embodiment, each of the short sides of the rear cutout has a length of about 2 inches and the long side of the rear cutout has a length of about 3 inches.

Each of the side edges of the platform has a generally trapezoidal side cutout 25,26 preferably generally centrally positioned on the respective side edge between the front and back edges of the platform. The side cutouts of the side edges form a narrowing portion of the platform such that the platform has a generally 8-shaped outer perimeter. Each of the side cutouts of the side edges has a spaced apart pair of short sides 27,28 and a long side 29 connecting the short sides of the respective side cutout together. Preferably, the long sides of the side cutouts are extended generally parallel to one another and generally perpendicular to the long side of the rear cutout. In an ideal illustrative embodiment, each the short sides of each of the side cutouts has a length of about 1½ inches and the long side of each of the side cutouts has a length of about 2 inches.

Ideally, the platform has a length defined between the front and back edges of about 13 inches, and a width defined between the side edges of about 8½ inches. In this ideal embodiment, the narrow portion of the platform has a width defined between the long sides of the side cutouts of about 5½ inches.

Each of the side edges of the platform has a spaced apart pair of generally inverted L-shaped mounting arms 30,31, 32,33 upwardly extending from the top surface of the platform. The side cutout of each of the side edges is located between the mounting arms of the respective side edge. Each mounting arm has a generally vertical lower portion 34 and a generally horizontal upper portion 35 outwardly extending in a direction away from the platform. The lower portions of the mounting arms are preferably extended generally perpendicular to the top surface of the platform. The upper portions of the mounting arms are extending generally parallel to the top surface of the platform. The upper portion of each of the mounting arms preferably has a downwardly depending end flange 36. The end flange of each upper portion is spaced apart from the associated lower portion of the respective mounting arm.

The end flanges are preferably extended generally parallel with their associated lower portion of the respective mounting arm. In an ideal illustrative embodiment, the lower portion of each of the mounting arms has a length defined between the top surface of the platform and the upper portion of the respective mounting arm of about 3½ inches.

In this ideal illustrative embodiment, the upper portion of each of the mounting arms has a length defined between the lower portion of the respective mounting arm and the associated end flange of the respective upper portion of about 1¾ inches. Each of the end flanges has a length defined from the associated upper portion of about 3½ inches in this ideal illustrative embodiment.

In use, the upper portions of the mounting arms are designed for resting on a rim of a toilet bowl with the lower portions of the mounting arms downwardly extending into the toilet bowl such that the platform is positioned in the toilet bowl in a generally horizontal plane. The end flanges of the upper portions are designed for hanging over the exterior of the toilet bowl to help hold the platform in a stationary position in the toilet bowl. In use, the platform is designed for resting a pet such as a cat thereon. The platform is designed for positioning at a level in the toilet bowl such that the platform is submerged under a flushed water level in the toilet bowl when the toilet bowl is flushed with water and such that the platform is positioned above a non-flushed water level in the toilet bowl below the flushed water level when the toilet bowl is in an non-flushed state that is not is flushed. The front edge of the platform is designed for positioning towards a front of the toilet bowl. The back edge of the platform is designed for positioning towards a back end of the toilet bowl. In use, the rear and side cutouts of the platform are designed for permitting water and wastes to pass around the platform in the toilet bowl when the water level in the toilet bowl drops from the flushed water level to the non-flushed water level to clean the top surface of the platform of wastes thereon.

Each of the side edges of the platform preferably has a generally inverted rectangular U-shaped lifting handle 37,38 upwardly extending from the top surface of the platform. Each of the lifting handles has a spaced apart pair of generally vertical arm portions 39,40 and a generally vertical upper cross portion 41 connecting upper ends of the arm portions of the respective lifting handle together. The cross portions of the lifting handles are designed for grasping by the hands of a user to lift the platform in and out of the toilet bowl. Preferably, the arm portions of the lifting handles are extended generally perpendicular to the top surface of the platform and generally parallel to the lower portions of the mounting arms. The cross portions of the lifting handles are preferably extended generally perpendicular to the associated arm portions of the respective lifting handle. The cross portions of the lifting handles also preferably generally lie in planes positioned above the upper portions of the mounting arms that are also generally parallel planes to one another. In an ideal illustrative embodiment, each of the arm portions has a length defined between the top surface of the platform and the associated cross portion of about 5 inches. In this ideal illustrative embodiment, each of the cross portions has a length defined between the associated arm portions of about 5 inches.

Figure 4:
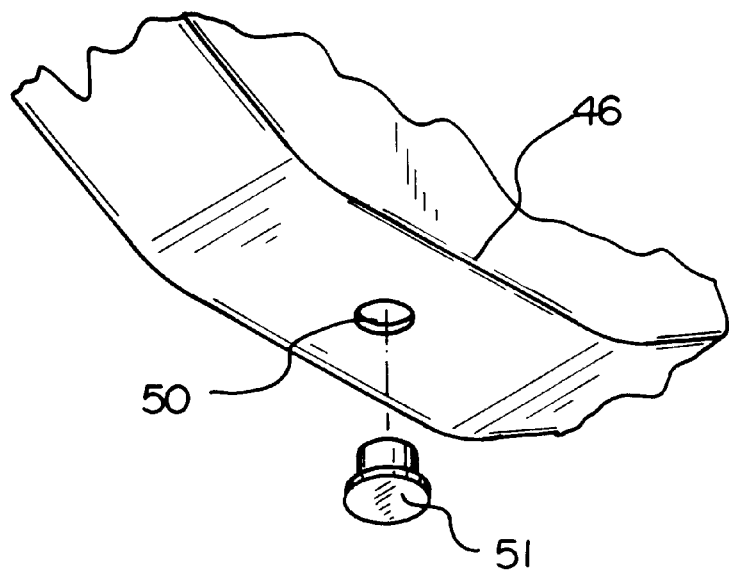
FIG. 4 is a schematic enlarged perspective view of the bottom wall of the drip tray of the present invention.
Figure 5:
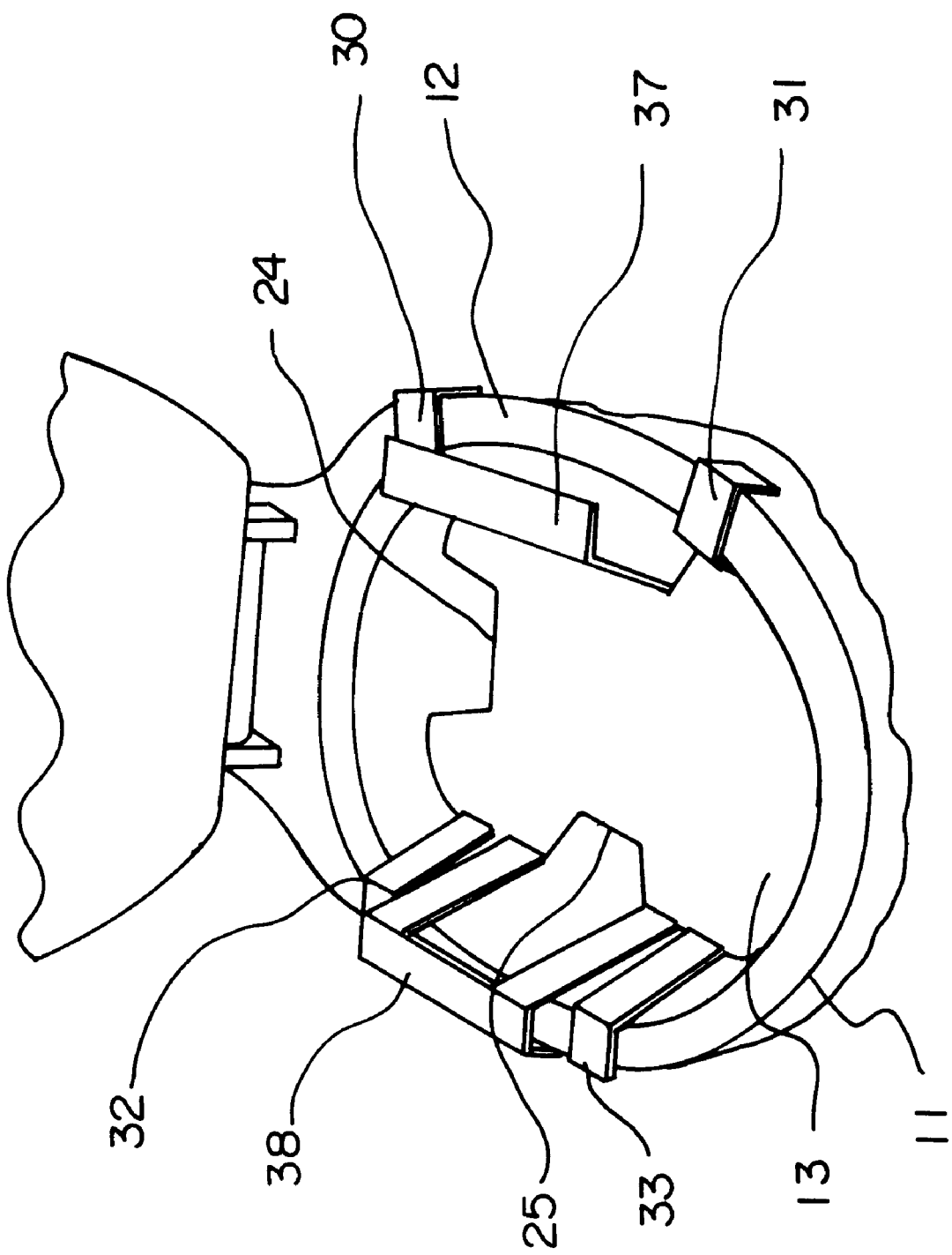
FIG. 5 is a schematic top perspective view of the present invention in use in a toilet bowl.

With reference to FIGS. 3 and 4, a drip tray 42 may be included adapted for mounting to a wall structure. The drip tray has a back wall 43, a pair of side walls 44,45 and a bottom wall 46. The back wall has a plurality of holes 47 adapted for extending fasteners therethrough to mount the drip tray to a wall structure. The back wall of the drip tray also has a hook 48 positioned towards a top end of the drip tray. The hook may be extended through the aperture of the platform such that the platform is suspended from the hook of the back wall with the platform positioned between the side walls of the drip tray and the bottom wall positioned beneath the platform. The bottom wall has a pair of generally rectangular notches 49 for extending the mounting arms located towards the back edge of the platform. The bottom wall has a drain hole 50 to permit draining of fluid collected in the drip tray from the platform. Preferably, the drain hole has a plug 51 substantially closing the drain hole.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A pet accessory for mounting on a toilet bowl, comprising:
   a platform having top and bottom surfaces, front and back edges and a pair of side edges extending between said front and back edges of said platform;
   each of said side edges of said platform having a spaced apart pair of mounting arms upwardly extending from said top surface of said platform;
   each of said mounting arms having lower portion and a upper portion outwardly extending in a direction away from said platform; and
   said upper portions of said mounting arms being for resting on a rim of a toilet bowl, said lower portions of said mounting arms being for downwardly extending into the toilet bowl such that said platform is positioned in said toilet bowl.

2. The pet accessory of claim 1, wherein said front and back edges of said platform each are generally arcuate and each have an outwardly facing convexity.

3. The pet accessory of claim 1, wherein said platform has an aperture therethrough extending between said top and bottom surfaces of said platform, said aperture being positioned towards said front edge of said platform.

4. The pet accessory of claim 1, wherein said back edge of said platform has a rear cutout.

5. The pet accessory of claim 1, wherein each of said side edges of said platform has a side cutout, said side cutout of each of said side edges being located between said mounting arms of the respective side edge.

6. The pet accessory of claim 1, wherein said upper portion of each of said mounting arms has a downwardly depending end flange, said end flange of each upper portion being spaced apart from the associated lower portion of the respective mounting arm, said end flanges of said upper portions being for hanging over the exterior of the toilet bowl to help hold the platform in a stationary position in the toilet bowl.

7. The pet accessory of claim 1, wherein each of said side edges of said platform has a lifting handle upwardly extending from said top surface of said platform, each of said lifting handles having a spaced apart pair of arm portions and an upper cross portion connecting said arm portions of the respective lifting handle together.

8. The pet accessory of claim 7, wherein said cross portions of said lifting handles generally lie in planes positioned above said upper portions of said mounting arms.

9. A pet accessory for mounting on a toilet bowl, comprising:

a generally flat platform having substantially planar top and bottom surfaces, front and back edges and a pair of side edges extending between said front and back edges of said platform;

said front and back edges of said platform each being generally arcuate and each having an outwardly facing convexity;

said platform having a generally circular aperture therethrough extending between said top and bottom surfaces of said platform, said aperture being positioned towards said front edge of said platform and generally centrally positioned between said side edges of said platform;

said back edge of said platform having a generally trapezoidal rear cutout generally centrally positioned between said side edges of said platform;

said rear cutout of said back edge having a spaced apart pair of short sides and a long side connecting said short sides of said rear cutout together;

said long side of said read cutout being extended generally perpendicular to said side edges of said platform;

each of said side edges of said platform having a generally trapezoidal side cutout generally centrally positioned between said front and back edges of said platform;

each of said side cutouts of said side edges having a spaced apart pair of short sides and a long side connecting said short sides of the respective side cutout together;

said long sides of said side cutouts being extended generally parallel to one another and generally perpendicular to said long side of said rear cutout;

each of said side edges of said platform having a spaced apart pair of generally inverted L-shaped mounting arms upwardly extending from said top surface of said platform;

said side cutout of each of said side edges being located between said mounting arms of the respective side edge;

each of said mounting arms having a generally vertical lower portion and a generally horizontal upper portion outwardly extending in a direction away from said platform;

said lower portions of said mounting arms being extended generally perpendicular to said top surface of said platform, said upper portions of said mounting arms being extending generally parallel to said top surface of said platform;

said upper portion of each of said mounting arms having a downwardly depending end flange, said end flange of each upper portion being spaced apart from the associated lower portion of the respective mounting arm, said end flange of each upper portion being extended generally parallel with the associated lower portion of the respective mounting arm;

said upper portions of said mounting arms being for resting on a rim of a toilet bowl, said lower portions of said mounting arms being for downwardly extending into the toilet bowl such that said platform is positioned in said toilet bowl in a generally horizontal plane, said end flanges of said upper portions being for hanging over the exterior of the toilet bowl to help hold the platform in a stationary position in the toilet bowl, said platform being for resting a pet thereon, said platform being for positioning at a level in the toilet bowl such that said platform is submerged under a flushed water level in the toilet bowl when the toilet bowl is being flushed with water and such that said platform is positioned above a non-flushed water level in the toilet bowl below the flushed water level when the toilet bowl is in an non-flushed state, said front edge of said platform being for positioning towards a front of the toilet bowl, said back edge of said platform being for positioning towards a back end of the toilet bowl, said rear and side cutouts of said platform being for permitting water and wastes to pass around said platform in the toilet bowl when the water level in the toilet bowl drops from the flushed water level to the non-flushed water level to clean said top surface of said platform of wastes thereon;

each of said side edges of said platform having a lifting handle upwardly extending from said top surface of said platform;

each of said lifting handles having a spaced apart pair of generally vertical arm portions and a generally vertical upper cross portion connecting said arm portions of the respective lifting handle together; and said arm portions of said lifting handles being extended generally perpendicular to said top surface of said platform and generally parallel to said lower portions of said mounting arms, said cross portions of said lifting handles being extending generally perpendicular to the associated arm portions of the respective lifting handle, said cross portions of said lifting handles generally lying in planes positioned above said upper portions of said mounting arms, said cross portions and said upper portions generally lying in generally parallel planes to one another.

* * * * *